United States Patent
Yun

(10) Patent No.: US 10,652,616 B2
(45) Date of Patent: May 12, 2020

(54) METHOD OF PROVIDING IMAGE DATA BASED ON CLOUD STREAMING, AND APPARATUS THEREFOR

(71) Applicant: SK PLANET CO., LTD., Seongnam-si, Gyeonggi-do (KR)

(72) Inventor: Hongseo Yun, Incheon (KR)

(73) Assignee: SK PLANET CO., LTD., Seongnam-si, Gyeonggi-do (KR)

( * ) Notice: Subject to any disclaimer, the term of this patent is extended or adjusted under 35 U.S.C. 154(b) by 0 days.

(21) Appl. No.: 15/121,291

(22) PCT Filed: Feb. 24, 2015

(86) PCT No.: PCT/KR2015/001768
§ 371 (c)(1),
(2) Date: Aug. 24, 2016

(87) PCT Pub. No.: WO2015/130062
PCT Pub. Date: Sep. 3, 2015

(65) Prior Publication Data
US 2017/0019712 A1     Jan. 19, 2017

(30) Foreign Application Priority Data
Feb. 28, 2014   (KR) ........................ 10-2014-0024326

(51) Int. Cl.
*H04N 21/458*    (2011.01)
*H04H 20/42*     (2008.01)
(Continued)

(52) U.S. Cl.
CPC ........ *H04N 21/458* (2013.01); *H04H 20/426* (2013.01); *H04H 60/27* (2013.01);
(Continued)

(58) Field of Classification Search
None
See application file for complete search history.

(56) References Cited

U.S. PATENT DOCUMENTS

| | | | |
|---|---|---|---|
| 6,898,762 B2 * | 5/2005 | Ellis ........................ | H04H 60/31 715/716 |
| 6,938,208 B2 * | 8/2005 | Reichardt .......... | H04N 5/44543 715/719 |

(Continued)

FOREIGN PATENT DOCUMENTS

| | | |
|---|---|---|
| KR | 10-2012-0026695 A | 3/2012 |
| KR | 10-2013-0066069 A | 6/2013 |
| KR | 10-2013-0134623 A | 12/2013 |

OTHER PUBLICATIONS

International Search Report dated May 22, 2015 for PCT/KR2015/001768.
(Continued)

*Primary Examiner* — An Son P Huynh
(74) *Attorney, Agent, or Firm* — Fenwick & West LLP

(57) ABSTRACT

The present invention relates to a method of providing image data based on cloud streaming. In particular, the method uses memory space of a terminal, prestores image data in the terminal, captures an execution screen regarding execution of a specific application, extracts video content from the prestored image data based on the captured execution screen and information regarding the execution screen, simultaneously encodes individual items of the extracted video content, and provides the encoded video content to a screen. Thus, according to the present invention, usage of the cloud streaming server and the network may be reduced by an amount commensurate with the resources utilization of the terminal. Network load may also be reduced when a (Continued)

live video or a VOD video is not being watched, and the rich GUI experience may be guaranteed in a standby state.

3 Claims, 4 Drawing Sheets

(51) Int. Cl.
   *H04N 21/442* (2011.01)
   *H04H 60/27* (2008.01)
   *H04N 21/433* (2011.01)
   *H04N 21/235* (2011.01)

(52) U.S. Cl.
   CPC ....... *H04N 21/235* (2013.01); *H04N 21/4331* (2013.01); *H04N 21/4424* (2013.01); *H04N 21/44218* (2013.01)

(56) References Cited

U.S. PATENT DOCUMENTS

| | | | | |
|---|---|---|---|---|
| 7,814,524 B2* | 10/2010 | Candelore | H04N 5/44543 | 715/716 |
| 7,882,528 B1* | 2/2011 | Taylor | H04N 5/44543 | 725/46 |
| 7,996,791 B2* | 8/2011 | Rashkovskiy | H04N 5/44543 | 709/219 |
| 8,499,256 B1* | 7/2013 | Iten | H04N 21/4821 | 715/810 |
| 8,681,277 B2* | 3/2014 | Jeong | H04N 5/50 | 348/732 |
| 8,782,701 B2* | 7/2014 | Yu | H04N 5/44543 | 725/39 |
| 9,092,910 B2* | 7/2015 | Perry | G06T 11/00 | |
| 9,176,703 B2* | 11/2015 | Kim | G06F 3/1446 | |
| 9,460,072 B2* | 10/2016 | Balasubramanian | G06K 9/00449 | |
| 9,467,486 B2* | 10/2016 | Gurbag | H04L 65/403 | |
| 9,565,466 B2* | 2/2017 | Hsu | H04N 21/4312 | |
| 9,800,941 B2* | 10/2017 | Evans | H04N 5/765 | |
| 9,813,760 B2* | 11/2017 | Wen | H04N 21/25808 | |
| 2002/0069218 A1* | 6/2002 | Sull | G06T 3/4092 | 715/202 |
| 2002/0174430 A1* | 11/2002 | Ellis | G11B 27/005 | 725/46 |
| 2005/0028208 A1* | 2/2005 | Ellis | H04N 7/163 | 725/58 |
| 2005/0210145 A1* | 9/2005 | Kim | H04N 21/4786 | 709/231 |
| 2006/0120624 A1* | 6/2006 | Jojic | G06F 16/745 | 382/284 |
| 2007/0154163 A1* | 7/2007 | Cordray | H04N 5/782 | 386/278 |
| 2007/0157281 A1* | 7/2007 | Ellis | H04N 7/17309 | 725/134 |
| 2007/0250901 A1* | 10/2007 | McIntire | H04N 7/17318 | 725/146 |
| 2008/0022322 A1* | 1/2008 | Grannan | H04N 5/44591 | 725/78 |
| 2008/0127253 A1* | 5/2008 | Zhang | H04N 21/478 | 725/35 |
| 2008/0199150 A1* | 8/2008 | Candelore | H04N 7/163 | 386/241 |
| 2008/0320546 A1* | 12/2008 | Moon | H04N 7/17318 | 725/136 |
| 2009/0063681 A1* | 3/2009 | Ramakrishnan | H04N 7/17318 | 709/225 |
| 2009/0265737 A1* | 10/2009 | Issa | G06Q 10/10 | 725/38 |
| 2010/0058405 A1* | 3/2010 | Ramakrishnan | H04N 7/17318 | 725/97 |
| 2010/0153885 A1* | 6/2010 | Yates | G06F 3/0482 | 715/841 |
| 2010/0192183 A1* | 7/2010 | Hu | H04N 7/165 | 725/62 |
| 2010/0251318 A1* | 9/2010 | Simoes Rodrigues | H04N 1/00214 | 725/114 |
| 2010/0262938 A1* | 10/2010 | Woods | G06T 15/20 | 715/850 |
| 2011/0078717 A1* | 3/2011 | Drummond | H04N 21/4586 | 725/14 |
| 2011/0164175 A1* | 7/2011 | Chung | H04N 21/4126 | 348/468 |
| 2011/0167447 A1* | 7/2011 | Wong | H04N 21/42208 | 725/40 |
| 2011/0282906 A1* | 11/2011 | Wong | G06F 16/434 | 707/780 |
| 2012/0162523 A1* | 6/2012 | Bastide | G06F 3/0482 | 348/569 |
| 2012/0198335 A1 | 8/2012 | Huang | | |
| 2012/0304229 A1* | 11/2012 | Choi | H04N 21/8173 | 725/41 |
| 2013/0027613 A1* | 1/2013 | Kim | H04N 21/4126 | 348/563 |
| 2013/0036442 A1* | 2/2013 | Wingert | H04N 21/42209 | 725/60 |
| 2013/0083210 A1* | 4/2013 | Beckham | H04N 21/2743 | 348/207.11 |
| 2013/0137511 A1* | 5/2013 | Bae | G07F 17/3225 | 463/29 |
| 2013/0151934 A1* | 6/2013 | McConville | H04N 21/234327 | 715/201 |
| 2013/0159375 A1 | 6/2013 | Perry et al. | | |
| 2013/0346546 A1 | 12/2013 | Jung | | |
| 2014/0035877 A1* | 2/2014 | Cai | H04H 60/33 | 345/175 |
| 2014/0115454 A1* | 4/2014 | Li | G06F 17/212 | 715/273 |
| 2014/0223490 A1* | 8/2014 | Pan | H04N 21/42224 | 725/61 |
| 2014/0282668 A1* | 9/2014 | Gava | H04N 21/44213 | 725/19 |
| 2015/0020135 A1* | 1/2015 | Frusina | H04N 21/4621 | 725/116 |
| 2015/0121409 A1* | 4/2015 | Zhang | H04N 21/6582 | 725/18 |
| 2015/0138385 A1* | 5/2015 | Kim | H04N 5/23216 | 348/211.99 |
| 2015/0281765 A1* | 10/2015 | Lee | H04N 21/8133 | 725/32 |
| 2015/0289002 A1* | 10/2015 | Choi | H04N 21/23418 | 725/19 |
| 2016/0005234 A1* | 1/2016 | Boivin | H04N 5/272 | 345/419 |
| 2016/0094868 A1* | 3/2016 | Singhal | H04N 21/44008 | 725/38 |
| 2016/0129883 A1* | 5/2016 | Penilla | B60R 25/305 | 348/148 |

OTHER PUBLICATIONS

Extended European Search Report dated Oct. 16, 2017 from European Patent Office in connection counterpart European Patent Application No. 15755686.1.
European Patent Office, Office Action, European Patent Application No. 15755686.1, dated Mar. 3, 2020, 7 pages.

* cited by examiner

METHOD OF PROVIDING IMAGE DATA BASED ON CLOUD STREAMING, AND APPARATUS THEREFOR

CROSS REFERENCE TO RELATED APPLICATION

This present application is a national stage filing under 35 U.S.C § 371 of PCT application number PCT/KR2015/001768 filed on Feb. 24, 2015 which is based upon and claims the benefit of priority to Korean Patent Application No. 10-2014-0024326 filed on Feb. 28, 2014 in the Korean Intellectual Property Office. The disclosures of the above-listed applications are hereby incorporated by reference herein in their entirety.

TECHNICAL FIELD

The present invention relates to a method of providing image data based on cloud streaming, and more particularly, to a cloud-streaming-based image data provision method that utilizes a memory space of a terminal in order to minimize network load required to transmit video data, prestores image data in the terminal, captures an execution screen regarding the execution of a specific application, extracts video content from the prestored image data on the basis of the captured execution screen and information regarding the execution screen, simultaneously encodes individual items of the extracted video content, and provides the encoded video content to a screen and an apparatus therefor.

BACKGROUND ART

With the development of mobile communication network and the advances in terminal performance specs, mobile communication terminals have become necessities for modern people and are evolving into total entertainment devices beyond the typical just simple communication devices or information providing devices.

In particular, with the development of a computer network technology, an existing computing environment that depends on independent hardware performance of each terminal is evolving into a cloud computing environment that provides service upon the terminal's request by utilizing all computing resources on a network.

Cloud computing may be defined as an on-demand outsourcing service for computing resources that are provided over an information communication network such as the Internet. In a cloud computing environment, a service provider integrates data centers distributed in several areas by utilizing virtualization technology and provides needed services to users. A service user selectively uses a desired virtual space service generated through a virtualization technology at the desired time, instead of installing and using computing resources such as applications, storage, an operating system (OS), and security in the user's terminal. In other words, cloud computing refers to a computing service in which a user borrows desired computing resources such as hardware/software that exist in an intangible form such as a cloud and pays the usage fee, that is, a technology for integrating computing resources existing in different physical locations by using a virtualization technology.

According to such a cloud computing, a user may connect to a cloud network through a terminal that performs only network connection functions and basic calculation functions and then perform tasks that require a large-scale storage device and high-performance computing resources and receive various services.

A cloud streaming service is a service that renders a screen for a result performed by a server, encodes video in real time, and transfers the encoded video to a terminal. The terminal decodes and then displays the video.

Typically, in addition to a live video or video-on-demand (VOD) video, a graphic user interface (GUI) screen that is rendered in a menu or application is encoded to a video and then transferred to the terminal.

However, such a service requires transmission of large-scale video data. Furthermore, even when a live video or VOD video is not watched, video data is continuously transmitted, thus increasing network load and also increasing cost due to traffic.

DISCLOSURE

Technical Problem

In order to solve problems of requiring large-scale video data transmission, increasing network load due to continuous video data transmission even when a live video or VOD video is not being watched and increasing cost due to traffic in a conventional cloud-streaming-based image data provision system, the present invention is directed to prestoring image data in a terminal, capturing an execution screen regarding execution of a specific application, extracting video content from the prestored image data on the basis of the captured execution screen and information regarding the execution screen, simultaneously encoding individual items of the extracted video content, and providing the encoded video content to a screen.

That is, for the cloud streaming service that provides a menu and an application GUI to a terminal device in addition to the live video or VOD video, the present invention is directed to providing a method of separately preparing for a short video clip in various forms such as movie previews or advertisements, receiving the short video clip by streaming and then storing (caching) the received short video clip in a storage space on the basis of a certain condition and logic, and, when a live video or VOD video is not being watched, performing a local playback of the short video clip that is temporarily stored in the terminal on the basis of the certain condition and logic and displaying the short video clip overlaid with a menu or an application GUI.

Technical Solution

In order to achieve the above objectives, a service device according to an embodiment of the present invention includes a service communication unit configured to communicate with at least one terminal to transmit and receive data for providing image data based on cloud streaming and a service control unit configured to transmit the image data to the terminal according to a predetermined condition and, when execution of a specific application is requested by the terminal, capture an execution screen regarding the execution of the application, provide the captured execution screen and information regarding the execution screen to the terminal, and control the terminal to extract video content from the transmitted image data based on the information regarding the execution screen and output the extracted video content such that the output video content is included in the execution screen.

The service control unit may provide individual items of the video content to be included in the execution screen together with content IDs and information regarding locations at which the individual items of the video content are to be displayed.

The service device may further include a service storage unit configured to store image data provided to a plurality of applications and the terminal.

A terminal according to an embodiment of the present invention includes a communication unit configured to communicate with a service device to transmit and receive data for providing image data based on cloud streaming and a control unit configured to request the service device to execute a specific application, receive an execution screen regarding execution of the application and information regarding the execution screen from the service device, confirm a content ID and location information for video content from the information regarding the execution screen, extract video content from prestored image data based on the confirmed information, simultaneously encode individual items of the extracted video content, map the encoded video content to location information, and perform control to output the mapped video content together with the execution screen.

The terminal may further include a storage unit configured to, when at least one piece of image data is received from the service device, store the received image data according to a predetermined condition and logic.

A system for providing image data based on cloud streaming according to an embodiment of the present invention includes a terminal and a service device, wherein the terminal is configured to request the service device to execute a specific application, receive an execution screen regarding execution of the application and information regarding the execution screen from the service device, confirm a content ID and location information for video content from the information regarding the execution screen, extract video content from prestored image data based on the confirmed information, simultaneously encode individual items of the extracted video content, map the encoded video content to location information, and perform control to output the mapped video content together with the execution screen and the service device is configured to transmit the image data to the terminal according to a predetermined condition and, when the execution of the specific application is requested by the terminal, capture the execution screen regarding the execution of the application and provide the captured execution screen and the information regarding the execution screen to the terminal.

A method of providing image data based on cloud streaming according to an embodiment of the present invention includes transmitting image data to at least one terminal according to a predetermined condition by a service device, when execution of a specific application is requested by the terminal, capturing an execution screen regarding the execution of the application by the service device, and controlling the service device to provide the captured execution screen and information regarding the execution screen to the terminal and controlling the terminal to extract video content from the transmitted image data based on the information regarding the execution screen and output the extracted video content such that the output video content is included in the execution screen.

The transmitting may include downloading image data in advance at every certain period or at a certain time or transmitting the image data to the terminal by streaming when there is a specific request, by the service device.

The capturing may include capturing only the GUI screen in the execution screen by the service device.

The providing may include providing individual items of the video content to be included in the execution screen together with content IDs and information regarding locations at which the individual items of the video content are to be displayed.

A method of providing image data based on cloud streaming according to the present invention includes requesting a service device to execute a specific application by a terminal, receiving an execution screen regarding execution of the application and information regarding the execution screen from the service device by the terminal, confirming a content ID and location information for video content from the information regarding the execution screen by the terminal, extracting video content from prestored image data based on the confirmed information by the terminal, simultaneously encoding individual times of the extracted video content by the terminal, and mapping the encoded video content to location information and outputting the mapped video content together with the execution screen by the terminal.

The method may further include, before the requesting of the execution of the application, receiving at least one piece of image data from the service device by the terminal and storing the received image data according to predetermined condition and logic by the terminal.

As another means for solving the objectives of the present invention, there is provided a computer-readable recording medium having a program for executing a method recorded therein, the method including transmitting image data to at least one terminal according to a predetermined condition, when execution of a specific application is requested by the terminal, capturing an execution screen regarding the execution of the application, and performing control to provide the captured execution screen and information regarding the execution screen to the terminal and to extract video content from the transmitted image data based on the information regarding the execution screen and output the extracted video content such that the output video content is included in the execution screen.

As another means for solving the objectives of the present invention, there is provided a computer-readable recording medium having a program for executing a method recorded therein, the method including requesting a service device to execute a specific application, receiving an execution screen regarding execution of the application and information regarding the execution screen from the service device, confirming a content ID and location information for video content from the information regarding the execution screen, extracting video content from prestored image data based on the confirmed information, simultaneously encoding individual items of the extracted video content, and mapping the encoded video content to location information and outputting the mapped video content together with the execution screen.

Advantageous Effects

According to the present invention, usage of the cloud streaming server and the network may be reduced by an amount commensurate with the resource utilization of the client device (e.g., terminal).

Network load may also be reduced when a live video or a VOD video is not being watched, and the rich GUI experience may be guaranteed in a standby state.

Purchasing paid videos may be encouraged by showing movie previews, drama trailers, advertisements, etc. in a standby state to increase sales. Customized services may be enhanced via short news or customized videos.

MODES FOR CARRYING OUT THE INVENTION

Figure 1:
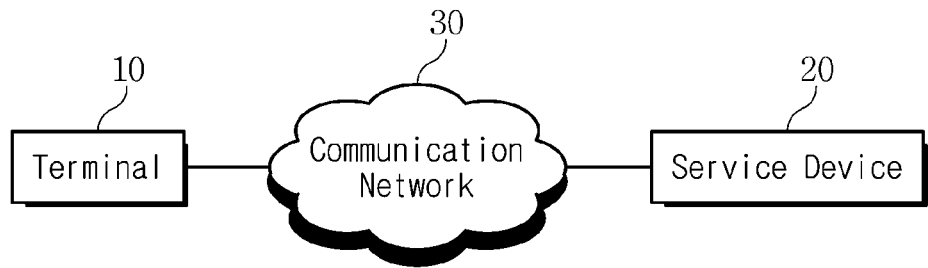
FIG. 1 is a view showing a configuration of a system for providing image data based on cloud streaming according to an embodiment of the present invention.

Hereinafter, preferred embodiments of the present invention will be described in detail with reference to the accompanying drawings. However, detailed descriptions related to well-known functions or configurations will be omitted in order not to unnecessarily obscure the subject matter of the present invention. In addition, it should be noted that like reference numerals denote like elements throughout the specification and drawings.

The terms or words used in the specification and claims should not be construed as being limited to the typical or dictionary meaning but should be construed as the meaning and concept corresponding to the technical idea of the present invention on the basis of the principle that an inventor can appropriately define the concept of the term for describing his or her invention in the best method. Accordingly, the configurations illustrated in embodiments and drawings described in the specification do not represent all of the technical idea of the present invention but are just exemplary embodiments. Thus, it should be understood that there may be various equivalents and modifications at the time of filing.

A mobile communication terminal that may be connected to a communication network and configured to provide image data based on cloud streaming will be described below as a representative example of a terminal according to an embodiment of the present invention. However, the terminal is not limited to the mobile communication terminal and may be applied to various terminals such as an information communication device, a multimedia terminal, a wired terminal, a stationary terminal, and an Internet Protocol (IP) terminal. In addition, the terminal may be utilized advantageously when the terminal is one of mobile terminals having various mobile communication specifications, such as a portable multimedia player (PMP), a mobile Internet device (MID), a smartphone, a desktop, a tablet PC, a note book, a net book, and other information communication devices.

In addition, the terminal according to the present invention are provided with all functions of a set-top box (STB) that may communicate with a service device to provide all data for providing image data and an image output device that provides a display function. On the other hand, an embodiment of the present invention may also be applied to an apparatus including the STB and the image output device independently, and, in this case, the STB and the image output device may be connected by wire or wirelessly to communicate with each other.

A system for providing image data based on cloud streaming according to an embodiment of the present invention will be described below.

FIG. 1 is a view showing a configuration of the system for providing image data based on cloud streaming according to an embodiment of the present invention.

Referring to FIG. 1, a cloud-streaming-based image data provision system 100 according to the present invention includes a terminal 10, a service device 20, and a communication network 30.

A processor installed in the terminal 10 or the service device 20 according to the present invention may process program instructions for executing the method according to the present invention. In one implementation, the processor may be a single-threaded processor. In another implementation, the processor may be a multithreaded processor. Furthermore, the processor may also process instructions stored in a memory or a storage device.

The communication network 30 performs a series of data transceiving operations for data transfer and information exchange between the terminal 10 and the service device 20. In particular, the communication network 30 may include various communication networks, e.g., wireless communication networks such as wireless LAN (WLAN), Wi-Fi, Wibro, Wimax, and high speed downlink packet access (HSDPA) and wired communication networks such as Ethernet, xDSL (e.g., ADSL or VDSL), hybrid fiber coaxial cable (HFC), fiber to the curb (FTTC), and fiber to the home (FTTH). However, the communication network 30 is not limited to the above-described communication networks and may include other communication networks that are widely known or will be developed in the future.

The terminal 10 is connected with the service device 20 over the communication network 30 and configured to transmit and receive all types of data for providing image data based on cloud streaming. In particular, the terminal 10 according to the present invention requests the service device 20 to execute a specific application and receives an execution screen regarding the execution of the application and information regarding the execution screen from the service device 20. The terminal 10 receives image data from the service device 20 and stores the received image data according to predetermined condition and logic.

The terminal 10 confirms a content ID and location information for video content from the information regarding the execution screen and extracts the video content from image data stored in advance based on the confirmed information. Subsequently, the terminal 10 encodes individual items of the extracted video content at the same time, maps the encoded video content to location information, and outputs the video content mapped to the location information.

The service device 20 is connected with the terminal 10 over the communication network 30 and configured to transmit and receive all types of data for providing image data based on cloud streaming. In particular, the service device 20 according to the present invention transmits the image data to the terminal 10 according to a predetermined condition. When the service device 20 is requested by the terminal 10 to execute a specific application, the service device 20 captures an execution screen regarding the execution of the application. Subsequently, the service device 20 provides the captured execution screen and information regarding the execution screen to the terminal 10.

That is, according to an embodiment of the present invention, the terminal 10 secures storage space to a certain level in advance, and the service device 20 prepares for various video clips. The video clips may include movie previews, drama trailers, short news, music video, and other personal videos.

When a menu GUI or an application GUI is transferred to the terminal 10, which is a client device, in the cloud streaming system and video playback is included in the GUI, the service device 20 also transfers a corresponding video ID to the terminal 10.

Subsequently, the terminal 10 decodes video content stored in a local storage using received identification information of the video content, selects any one from a picture in picture (PIP), an overlay, and an overlay with Alpha blend, processes the selection on the received GUI screen, and displays the GUI screen.

Thus, the present invention may reduce the usage of the cloud streaming server and the network by utilizing resources of the client device (e.g., terminal). The present invention may also reduce network load when a live video or a VOD video is not being watched and guarantee a rich GUI experience in a standby state. The present invention may also encourage purchasing paid videos by showing movie previews, drama trailers, advertisements, etc. to increase sales. The present invention may also enhance customized services via short news or customized videos.

The above-described process of providing image data based on cloud streaming according to an embodiment of the present invention will be described in more detail with reference to FIGS. 2 to 5.

Figure 2:
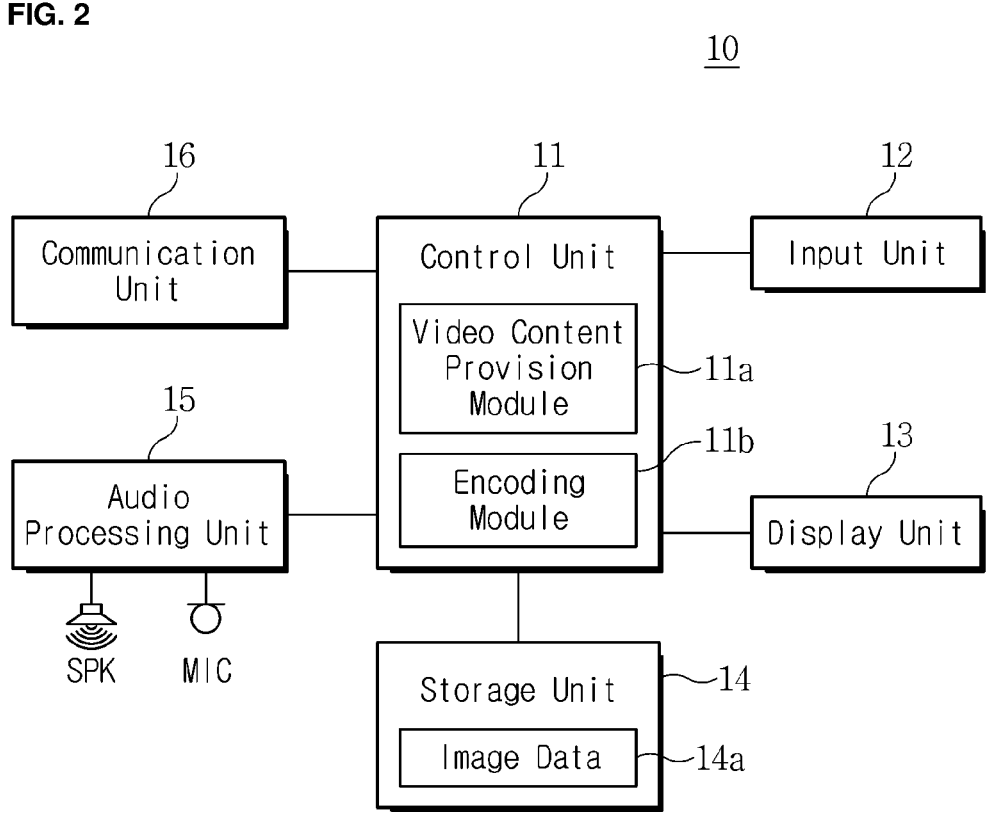
FIG. 2 is a block diagram showing a configuration of a terminal according to the present invention.

FIG. 2 is a block diagram showing a configuration of a terminal according to the present invention.

Referring to FIG. 2, the terminal 10 according to the present invention includes a control unit 11, an input unit 12, a display unit 13, a storage unit 14, an audio processing unit 15, and a communication unit 16.

The input unit 12 receives various types of information such as number and character information and sends signals to the control unit 11 for controlling various functions of the terminal 10. In addition, the input unit 12 may include at least one of a keypad and a touchpad which generate an input signal according to touch or manipulation of a user. Here, the input unit 12 may be configured as one touch panel (or touch screen) together with the display unit 13 to simultaneously perform input and display functions. The input unit 12 may include an input device such as a keyboard, a keypad, a mouse, and a joystick and any type of input means to be developed in the future. In particular, the input unit 12 according to the present invention detects an input signal that is associated with the execution of an application and sends the detected input signal to the control unit 11.

The display unit 13 displays information about a series of operation states and operation results that are generated while functions of the terminal 10 are performed. In addition, the display unit 13 may display a menu of the terminal 10, user data entered by the user, etc. Here, the display unit 13 may include a liquid crystal display (LCD), a thin film transistor LCD (TFT-LCD), a light emitting diode (LED), an organic LED (OLED), an active matrix OLED (AMOLED), a retina display, a flexible display, and a three-dimensional (3D) display. In this case, when the display unit 13 is configured in the form of a touch screen, the display unit 13 may perform some or all of the functions of the input unit 12. In particular, the display unit 13 according to the present invention outputs an application execution screen, video content, and cloud-streaming-based image data.

The storage unit 14 is a device for storing data. The storage unit 14 includes a main memory device and an auxiliary memory device and stores an application program needed to operate the functions of the terminal 10. The storage unit 14 may largely include a program area and a data area. Here, when each function is activated corresponding to the user's request, the terminal 10 executes a corresponding application program under the control of the control unit 11 to provide the function. In particular, the storage unit 14 according to the present invention stores an operating system for booting the terminal 10, a program for providing video content, a program for encoding the video content, etc. When image data is received from the service device 20, the storage unit 14 stores the received image data according to predetermined condition and logic.

The audio processing unit 15 performs a function of sending audio signal that is input from a speaker SPK or a microphone (MIC) to the control unit 11 in order to reproduce and output the audio signal. The audio processing unit 15 may convert an analog audio signal that is input through the microphone into a digital audio signal and send the digital audio signal to the control unit 11. In addition, the audio processing unit 15 may convert the digital audio signal that is output from the control unit 11 into an analog signal and output the analog signal through the speaker. In particular, the audio processing unit 15 according to the present invention outputs a sound effect or an execution sound according to the execution of an application or video content.

The communication unit 16 performs a function of transmitting and receiving data through the service device 20 and the communication network 30. Here, the communication unit 16 includes an RF transmitting part that up-converts a frequency of a transmitted signal and amplifies the transmitted signal, an RF receiving part that low-noise-amplifies a received signal and down-converts a frequency of the received signal, etc. The communication unit 16 may include at least one of a wireless communication module (not shown) and a wired communication module (not shown). The wireless communication module is configured to transmit and receive data according to a wireless communication method. When the terminal 10 uses wireless communication, the terminal 10 may use any one of a wireless network communication module, a wireless LAN communication module, and a wireless PAN communication module to transmit and receive data to and from the service device 20. In addition, the wired communication module is used to transmit and receive data in a wired manner. The wired communication module may connect to the communication network 30 in a wired manner to transmit and receive the data to and from the service device 20. In particular, the communication unit 16 according to the present invention communicates with the service device 20 to transmit and receive data for providing image data based on cloud streaming.

The control unit 11 may be a processing device that drives an operating system (OS) and each component. In particular, the control unit 11 according to an embodiment of the present invention requests the service device 20 to execute a specific application and receives an execution screen regarding the execution of the application and information regarding the execution screen from the service device 20. The control unit 11 receives image data from the service device 20 and stores the received image data according to predetermined condition and logic.

The control unit 11 confirms a content ID and location information for video content from the information regarding the execution screen and extracts the vide content from image data stored in advance based on the confirmed information. Subsequently, the control unit 11 encodes individual items of the extracted video content at the same time, maps the encoded video content to location information, and outputs the video content mapped to the location information.

Figure 3:
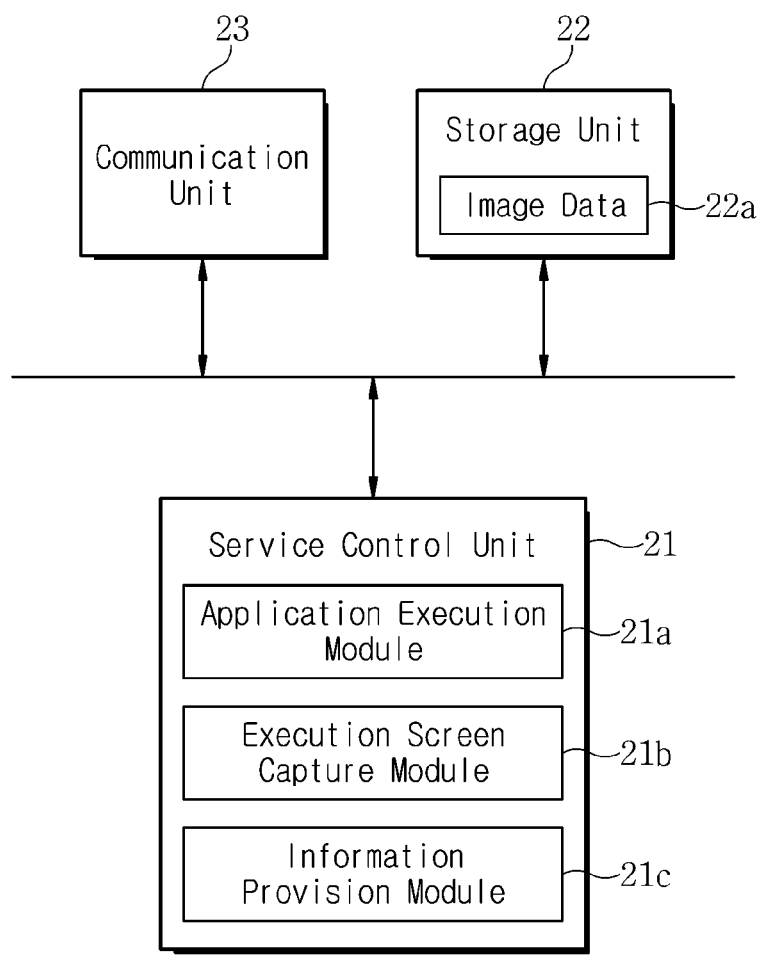
FIG. 3 is a block diagram showing a configuration of a service device according to the present invention.

FIG. 3 is a block diagram showing a configuration of a service device according to the present invention.

Referring to FIG. 3, the service device 20 according to the present invention includes a service control unit 21, a service storage unit 22, and a service communication unit 23.

The service communication unit 23 performs a function of transmitting and receiving data through the terminal 10 and the communication network 30. Here, the service communication unit 23 communicates with the terminal 10 to transmit and receive data for providing image data based on cloud streaming.

The service storage unit 22 stores all programs according to the execution of functions of the service device 20. In particular, the service storage unit 22 according to the present invention stores a program for executing an application, a program for capturing an execution screen of the application, a program for providing the captured execution screen and information regarding the execution screen, etc. In addition, the service storage unit 22 stores image data provided to a plurality of applications and the terminal 10.

The service control unit 21 may be a processing device that drives an operating system and each component. In particular, the service control unit 21 according to an embodiment of the present invention transmits the image data to at least one terminal according to a predetermined condition. In this case, the service control unit 21 downloads image data in advance at every certain period or at a certain time or transmits the image data to the terminal 10 by streaming when there is a specific request.

When the service control unit 21 is requested by the terminal 10 to execute a specific application, the service control unit 21 captures an execution screen regarding the execution of the application. In this case, the service control unit 21 captures only the GUI screen in the execution screen.

The service control unit 21 provides the captured execution screen and information regarding the execution screen to the terminal 10. That is, the service control unit 21 provides individual items of the video content to be included in the execution screen together with content IDs and information regarding locations at which the individual items of the video content are to be displayed.

A method of providing image data based on cloud streaming according to an embodiment of the present invention will be described below.

Figure 4:
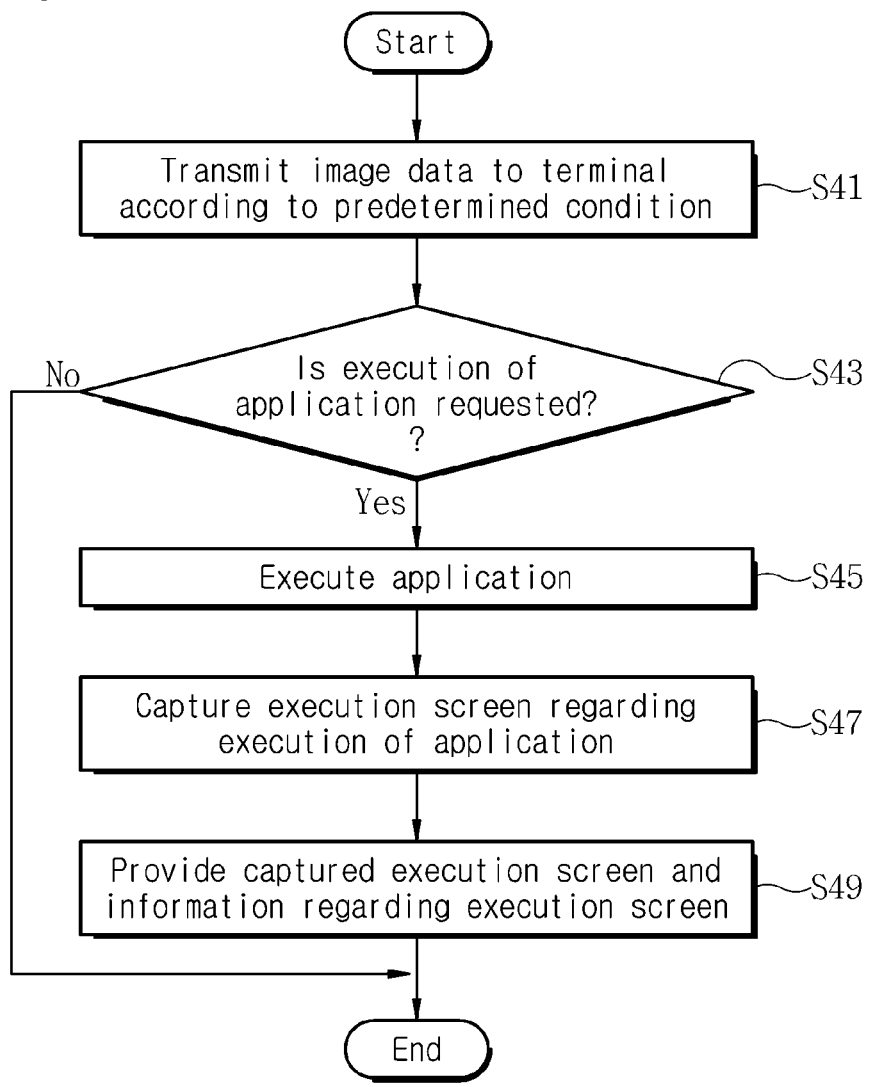
FIG. 4 is a flowchart showing a method of operating a service device for providing image data based on cloud streaming according to the present invention.

FIG. 4 is a flowchart showing a method of operating a service device for providing image data based on cloud streaming according to the present invention.

Referring to FIG. 4, in step S41, the service device 20 for providing image data based on cloud streaming according to the present invention transmits image data to the terminal 10 according to a predetermined condition. In this case, the service device 20 downloads image data in advance at every certain period or at a certain time or transmits the image data to the terminal 10 in streaming when there is a specific request.

In step S43, the service device 20 checks whether the service device 20 is requested by the terminal 10 to execute an application. When the service device 20 is requested by the terminal 10 to execute a specific application, the service device 20 executes the application in step S45.

In step S47, the service device 20 captures an execution screen regarding the execution of the application. In this case, the service device 20 captures only the GUI screen in the execution screen.

In step S49, the service device 20 provides the captured execution screen and information regarding the execution screen to the terminal 10. That is, the service device 20 provides individual items of the video content to be included in the execution screen together with content IDs and information regarding locations at which the individual items of the video content are to be displayed.

Figure 5:
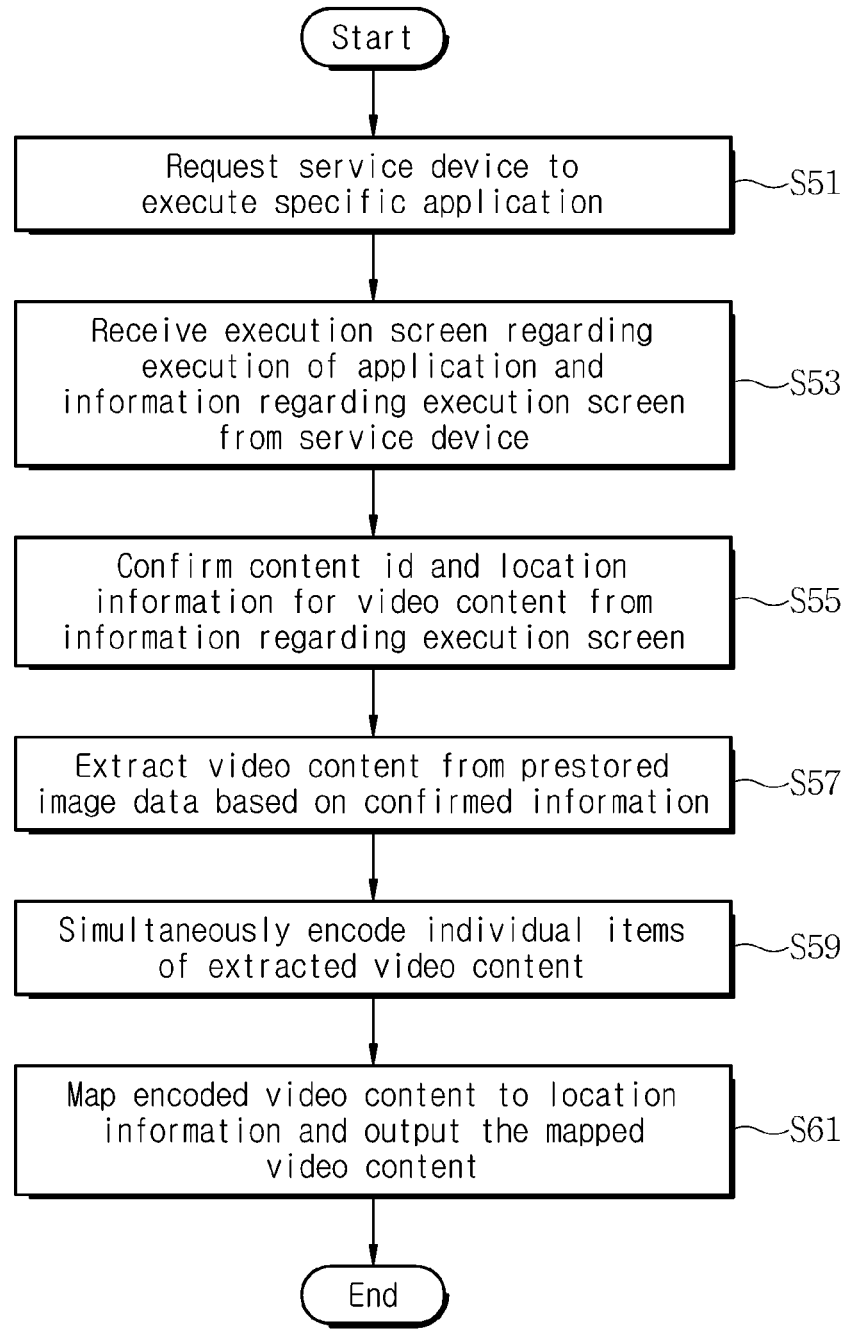
FIG. 5 is a flowchart showing a method of operating a terminal device for providing image data based on cloud streaming according to the present invention.

FIG. 5 is a flowchart showing a method of operating a terminal for providing image data based on cloud streaming according to the present invention.

Referring to FIG. 5, in step S51, the terminal 10 for providing image data based on cloud streaming according to the present invention requests the service device 20 to execute a specific application. In step S53, the terminal 10 receives an execution screen regarding the execution of the application and information regarding the execution screen from the service device 20. The terminal 10 receives image data from the service device 20 and stores the received image according to a predetermined condition and logic.

In step S55, the terminal 10 confirms a content ID and location information for video content from the information regarding the execution screen. In step S57, the terminal 10 extracts the vide content from image data stored in advance based on the confirmed information.

Subsequently, the terminal 10 encodes individual items of the extracted video content at the same time, maps the encoded video content to location information, and outputs the video content mapped to the location information (S59 and S61).

In addition, the service device 20 having the above-described configuration may be implemented as one or more servers that operate in a server-based computing scheme or a cloud computing scheme. In particular, information for providing image data according to the present invention may be provided through a cloud computing function that allows the information to be permanently stored in a cloud computing device. Here, the cloud computing refers to a technology for providing on-demand service for information technology (IT) resources that are virtualized by utilizing Internet technology in a digital terminal such as a notebook and a netbook, for example, hardware (e.g., a server, a storage, and a network), software (e.g., a database, security, and a web server), service, data, and the like.

A memory installed in the terminal 10 or the service device 20 stores information in the device. In an implementation, the memory is a computer-readable medium. In an implementation, the memory may be a volatile memory unit. In another implementation, the memory may also be a non-volatile memory unit. In an implementation, a storage device is a computer-readable medium. In various other implementations, the storage device may include, for example, a hard disk device, an optical disk device, or any other mass storage device.

Although an exemplary configuration of the apparatus has been described herein, implementations of the subject matter and the functional operations described in this specification can be implemented in other types of digital electronic circuitry or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, a data processing apparatus. The computer-readable medium can be a machine-readable storage device, a machine-readable storage substrate, a memory device, a material affecting a machine-readable propagated stream, or a combination of one or more of these.

Various techniques described herein can be implemented in digital electronic circuitry, or in computer hardware, firmware, software, or in combinations thereof. The techniques can be implemented as a computer program product, i.e., a computer program tangibly embodied in an information carrier, e.g., in a machine-readable storage device (computer-readable medium) or in a propagated signal for execution by, or to control the operation of, data processing apparatus, e.g., a programmable processor, a computer, or multiple computers. A computer program can be written in any form of a programming language, including compiled or interpreted languages and can be deployed in any form including a stand-alone program or a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing one or more computer programs to perform the functions by operating on input data and generating output. The method steps can also be performed by, and apparatus can also be implemented as, special purpose logic circuitry, e.g., a field programmable gate (FPGA) or an application-specific integrated circuit (ASIC).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer may include a processor for executing instructions and one or more memory devices for storing instructions and data. Generally, a computer will also include or be coupled to receive data from, transfer data to, or perform both on one or more mass storage devices for storing data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM). A processor and a memory may be supplemented by, or integrated into, a special purpose logic circuit.

The present specification includes details of a number of specific implements, but it should be understood that the details do not limit any invention or what is claimable in the specification but rather describe features of the specific embodiment. Features described in the specification in the context of individual embodiments may be implemented as a combination in a single embodiment. In contrast, features described in the specification in the context of a single embodiment may be implemented in multiple embodiments individually or in an appropriate sub-combination. Furthermore, the features may operate in a certain combination and may be initially described as claimed in the combination, but one or more features may be excluded from the claimed combination in some cases, and the claimed combination may be changed into a sub-combination or a modification of a sub-combination.

Similarly, even though operations are described in certain order on the drawings, it should not be understood as the operations needing to be executed in the certain order or in sequence to obtain desired results or as all the operation needing to be executed. In some cases, multitasking and parallel processing may be advantageous. In addition, it should not be understood as requiring the separation of various system components in the above described embodiments in all embodiments, and it should be understood that the above described program components and systems may be incorporated into a single software product or may be packaged in multiple software products.

It should be understood that the embodiments disclosed herein are merely illustrative and are not intended to limit the scope of the invention. Although specific embodiments have been illustrated and described herein, it is obvious to those skilled in the art that many modifications of the present invention may be made without departing from what is intended to be limited solely by the appended claims.

INDUSTRIAL APPLICABILITY

The present invention utilizes memory space of a terminal in order to minimize network load required to transmit video data, prestores image data in the terminal, captures an execution screen regarding the execution of a specific application, extracts video content from the prestored image data based on the captured execution screen and information regarding the execution screen, simultaneously encodes individual items of the extracted video content, and provides the encoded video content to a screen. Thus, according to the present invention, usage of the cloud streaming server and the network may be reduced by an amount commensurate with the resource utilization of the client device (e.g., terminal). Network load may be reduced when a live video or a VOD video is not being watched, and the rich GUI experience may be guaranteed in a standby state. Purchasing paid videos may be encouraged by showing movie previews, drama trailers, advertisements, etc. in a standby state to increase sales. Customized services may also be enhanced via short news or customized videos. Moreover, the present invention has industrial applicability in that the possibility of making sales or doing business is sufficient and also the present invention is actually carried out.

The invention claimed is:

1. A service device for executing an application upon request from a terminal and providing an execution screen to the terminal based on cloud streaming, the service device comprising:
   one or more processors;
   memory; and
   one or more programs, wherein the one or more programs are stored in the memory and configured to be executed by the one or more processors, the one or more programs including instructions for:
      transmitting a plurality of video content items via a network every certain period or at certain times for storing in the terminal before execution of an application, receiving a request to execute the application from the terminal via the network, responsive to receiving the request, executing the application to at least generate the execution screen of the application including a graphic user interface (GUI) screen and an associated video content item corresponding to one of the plurality of the video content items previously stored in the terminal, capturing, from the execution screen of the application, only the GUI screen, and providing, via the network, to the terminal the captured GUI screen a content ID of the associated video content item for indicating the corresponding one of the plurality of video content items previously stored in the terminal, and location information indicating a location of the video content item to be displayed with the captured GUI screen on the terminal to cause the terminal to combine the captured GUI screen received from the service device and the corresponding one of the plurality of video content items previously stored in the terminal into a combined content and display the combined content on the terminal.

2. A terminal for receiving an execution screen of an application from a service device based on cloud streaming through a network, the terminal comprising:

one or more processors; and memory storing one or more programs configured to be executed by the one or more processors, the one or more programs including instructions for:

receiving a plurality of video content items via a network every certain period or at certain times before requesting the service device to execute an application, storing the plurality of video content items in the memory of the terminal, sending a request to the service device, via the network, to execute the application and generate an execution screen of the application including a graphic user interface (GUI) screen and an associated video content item corresponding to one of the plurality of the video content items previously stored at the terminal, receiving from the service device, via the network, a GUI screen captured by the service device, a content ID of the associated video content item for indicating the corresponding one of the plurality of video content items previously stored in the terminal, and location information indicating a location of the video content item to be displayed with the captured GUI screen on the terminal, extracting, from the memory, based on the content ID, the corresponding one of the plurality of video content items combining the extracted one of the plurality of video content items with the GUI screen according to the location information, and displaying the combined content.

3. A method of providing image data based on cloud streaming, the method comprising:

transmitting, by a service device, a plurality of video content items via a network every certain period or at certain times for storing in the terminal before execution of the application;

receiving, by the service device via the network, a request to execute the application from the terminal;

responsive to receiving the request by the service device, executing the application to at least generate an execution screen of the application including a graphic user interface (GUI) screen and an associated video content item corresponding to one of the plurality of the video content items previously stored in the terminal;

capturing, by the service device, from the execution screen of the application, only the GUI screen; and providing, by the service device via the network, to the terminal, a content ID of the associated video content item for indicating the corresponding one of the plurality of video content items previously stored in the terminal, and location information indicating a location of the video content item to be displayed with the captured GUI screen on the terminal to cause the terminal to combine the captured GUI screen and the corresponding one of the plurality of video content items into a combined content and display the combined content on the terminal.

* * * * *